(12) United States Patent
Vamaraju et al.

(10) Patent No.: US 9,907,047 B1
(45) Date of Patent: Feb. 27, 2018

(54) PASSIVE POSITIONING PROCEDURE AND USE OF SINGLE BURST ASAP FTM SESSIONS

(71) Applicant: QUALCOMM Incorporated, San Diego, CA (US)

(72) Inventors: Santosh Vamaraju, San Jose, CA (US); Xiaoxin Zhang, Fremont, CA (US); Rahul Malik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/354,955

(22) Filed: Nov. 17, 2016

Related U.S. Application Data

(60) Provisional application No. 62/381,524, filed on Aug. 30, 2016.

(51) Int. Cl.
*H04W 64/00* (2009.01)
*G01S 5/10* (2006.01)
(Continued)

(52) U.S. Cl.
CPC ....... *H04W 64/003* (2013.01); *H04L 43/0864* (2013.01); *H04W 4/023* (2013.01); *H04W 24/10* (2013.01)

(58) Field of Classification Search
CPC .... H04W 64/003; H04W 4/023; H04W 24/10
(Continued)

(56) References Cited

U.S. PATENT DOCUMENTS

| 7,304,610 B2 | 12/2007 | Ninomiya et al. |
| 7,881,684 B2 | 2/2011 | Nakagawa et al. |

(Continued)

FOREIGN PATENT DOCUMENTS

| EP | 2511730 A1 | 10/2012 |
| JP | 2009229393 A | 10/2009 |

(Continued)

OTHER PUBLICATIONS

GB Search Report issued in related GB Appln. No. 1322872.1, dated Aug. 18, 2014.
(Continued)

*Primary Examiner* — Nathan Taylor
(74) *Attorney, Agent, or Firm* — Kilpatrick Townsend & Stockton, LLP

(57) ABSTRACT

Techniques for estimating a position of an observing station are disclosed based on capturing, at the observing station, a first and a second FTM message exchanged between a first messaging station and a second messaging station. At the observing station, a first time of arrival of the first FTM message and a second time of arrival of the second FTM message may be determined. Based on contents of one or more FTM messages, a first transmission-related time associated with the first FTM message and a second transmission-related time associated with the second FTM message may be obtained. The position of the observing station may be estimated based on (1) a position of the first messaging station, (2) a position of the second messaging station, (3) the first time of arrival, (4) the second time of arrival, (5) the first transmission-related time, and (6) the second transmission-related time.

27 Claims, 9 Drawing Sheets

(51) Int. Cl.
*H04W 4/02* (2018.01)
*H04W 24/10* (2009.01)
*H04L 12/26* (2006.01)

(58) Field of Classification Search
USPC .......................................... 455/456.1–456.6
See application file for complete search history.

(56) References Cited

U.S. PATENT DOCUMENTS

| | | | |
|---|---|---|---|
| 8,073,465 B2 | 12/2011 | Nakagawa et al. | |
| 8,165,150 B2 | 4/2012 | Aweya et al. | |
| 9,247,517 B2 | 1/2016 | Wigren et al. | |
| 2004/0224707 A1 | 11/2004 | Jou | |
| 2005/0020275 A1* | 1/2005 | Agrawala | G01S 5/02 455/456.1 |
| 2008/0112380 A1 | 5/2008 | Fischer et al. | |
| 2008/0291883 A1* | 11/2008 | Seok | H04W 64/00 370/338 |
| 2012/0106370 A1 | 5/2012 | Radulescu et al. | |
| 2012/0136923 A1 | 5/2012 | Grube | |
| 2012/0224590 A1 | 9/2012 | Norair | |
| 2012/0229334 A1* | 9/2012 | Waters | G01S 19/05 342/357.42 |
| 2012/0262339 A1* | 10/2012 | Garcia | G01S 5/10 342/387 |
| 2013/0157692 A1 | 6/2013 | Hall et al. | |
| 2014/0073352 A1* | 3/2014 | Aldana | G01S 5/10 455/456.1 |
| 2014/0132444 A1 | 5/2014 | Bird | |
| 2014/0154996 A1 | 6/2014 | Banin et al. | |
| 2014/0187259 A1 | 7/2014 | Kakani et al. | |
| 2014/0198725 A1* | 7/2014 | Abraham | H04L 67/16 370/328 |
| 2014/0200026 A1 | 7/2014 | Aldana | |
| 2014/0213193 A1* | 7/2014 | Zhang | G01S 11/02 455/67.11 |
| 2014/0254511 A1* | 9/2014 | Aldana | H04W 56/003 370/329 |
| 2014/0293851 A1* | 10/2014 | Abraham | H04W 52/0225 370/311 |
| 2014/0327579 A1 | 11/2014 | Hart et al. | |
| 2015/0063228 A1* | 3/2015 | Aldana | G01S 5/0081 370/329 |
| 2015/0094103 A1* | 4/2015 | Wang | H04W 4/023 455/456.6 |
| 2015/0139213 A1* | 5/2015 | Abraham | H04L 69/28 370/338 |
| 2016/0037477 A1 | 2/2016 | Cheng et al. | |
| 2016/0309472 A1* | 10/2016 | Yong | H04W 72/0446 |
| 2016/0366606 A1* | 12/2016 | Steiner | H04W 24/10 |

FOREIGN PATENT DOCUMENTS

| | | |
|---|---|---|
| WO | 0215614 A1 | 2/2002 |
| WO | 2008147046 A1 | 12/2008 |
| WO | 2015031029 A1 | 3/2015 |
| WO | 2016081271 A1 | 5/2016 |

OTHER PUBLICATIONS

IEEE: "IEEE P802.11-REVmc/D7.0", Part 11: Wireless LAN Medium Access Control (MAC) and Physical Layer (PHY) Specifications, Aug. 12, 2016, XP055407935, Retrieved from the Internet: URL:http://ieeexplore.ieee.org/stamp/stamp.jsp?tp=&arnumber=7542452 [retrieved on Sep. 19, 2017], 118 pages.
International Search Report and Written Opinion—PCT/US2017/039301—ISA/EPO—Sep. 27, 2017.
Lindskog E (CSR Technology): "Client Positioning using Timing Measurements between Access Points; 11-13-0072-00-000m-client-positioning-using-timing-measurements-between-access-points", IEEE SA Mentor; 11-13-0072-00-000M-Client-Positioning-Using-Timing-Measurements-Between-Access-Points, IEEE-SA Mentor, Piscataway, NJ USA, vol. 802.11m, Jan. 12, 2013 (Jan. 12, 2013), pp. 1-13, XP068040470, [retrieved on Jan. 12, 2013] p. 4-p. 6 p. 11.

* cited by examiner

| Number of Bits | Subfield Name | Description |
|---|---|---|
| 4 | Max Burst Duration | Maximum time of a burst (same as 802.11REVmc) |
| 6 | Min Delta FTM | Time from the start of a FTM frame to the start of the following FTM frame in a burst (same as 802.11REVmc) |
| 5 | Max FTMs per burst | Maximum Number of successfully sent measurement frames sent in a burst (same as 802.11REVmc) |
| 6 | FTM Format and Bandwidth | PHY frame type and bandwidth for FTM measurement frame (same as 802.11REVmc) |
| 3 | Status | 0 = Reserved, 1 = Success, 2 = Incapable |
| xx | reserved | Variable |

*FIG. 4*

FTM Request Message:

| Category | Public Action | Trigger | LCI Measurement Request (optional) | Location Civic Measurement Request (optional) | Fine Timing Measurement Parameters (optional) |
|---|---|---|---|---|---|
| 1 | 1 | 1 | Variable | Variable | Variable |

Octets:

*FIG. 5A*

PASSIVE POSITIONING PROCEDURE AND USE OF SINGLE BURST ASAP FTM SESSIONS

CROSS-REFERENCE TO RELATED APPLICATIONS

This patent application claims the benefit of U.S. Provisional Patent Application No. 62/381,524, filed Aug. 30, 2016, and entitled "PASSIVE POSITIONING PROCEDURE AND USE OF SINGLE BURST ASAP FTM SESSIONS," which is incorporated by reference herein in its entirety for all purposes.

BACKGROUND

Position determination is a key enabling feature that supports myriads of applications and functions in modern devices. A mobile device, such as a smart phone, that is capable of determining its own position becomes a much more useful device in the context of mapping, navigation, social applications, gaming, Internet of Things, and many other areas. Traditionally, position determination for a particular device involves the use of signals actively transmitted from and received by the device, to measure distances to other devices nearby, e.g., by using round trip time (RTT), and calculate a position estimate for the device. However, there are significant disadvantages associated with the active transmission and reception of such positioning signals. One disadvantage is the risk of compromised privacy. By participating in the active transmission and/or reception of signals for purposes of position determination, a device may reveal its existence and/or other information to nearby devices. Another disadvantage is power consumption. Active transmission and reception of signals for position determination is often performed in addition to routine transmission and reception of data signals and other device operations and can create an additional drain on the precious battery reserves of the device. Yet another disadvantage is the lack of scalability. If a large number of mobile devices in an area all require position determination, the sheer number of active positioning signal transmissions and receptions that may occur simultaneously may overwhelm systems and devices, such as access points (APs), responsible for handling such traffic. There is a pressing need for position determination techniques that can address these and other challenges.

SUMMARY

Embodiments of the disclosure relate to a technique for estimating a position of an observing station. The technique may involve, at the observing station, capturing a plurality of packetized FTM messages exchanged between a pair of messaging stations comprising a first messaging station and a second messaging station. The plurality of packetized FTM messages may include a first FTM message originating from the first messaging station and intended for the second messaging station and further include a second FTM message originating from the second messaging station and intended for the first messaging station. The technique may further involve, at the observing station, determining a first time of arrival corresponding to a time at which the first FTM message arrives at the observing station. According to at least one embodiment, the first FTM message is part of an FTM session configured for an immediate, single burst (ASAP=1, burst exponent=0). The technique may further involve, at the observing station, determining a second time of arrival corresponding to a time at which the second FTM message arrives at the observing station. In addition, the technique may involve obtaining, based on contents of one of the plurality of packetized FTM messages, a first transmission-related time associated with transmission or reception of the first FTM message from the first messaging station to the second messaging station. The technique may also involve obtaining, based on contents of one of the plurality of packetized FTM messages, a second transmission-related time associated with transmission or reception of the second FTM message from the second messaging station to the first messaging station. The position of the observing station may be estimated based on (1) a position of the first messaging station, (2) a position of the second messaging station, (3) the first time of arrival, (4) the second time of arrival, (5) the first transmission-related time, and (6) the second transmission-related time.

The first FTM message may be an FTM frame, and the second FTM message may be an acknowledgement message acknowledging the FTM frame. The first transmission-related time may be a time of departure (ToD) corresponding to transmission of the first FTM message, as a first FTM frame, M, from the first messaging station. The second transmission-related time may be a time of arrival (ToA) corresponding to reception of the second FTM message, as an acknowledgement frame for the first FTM frame, M, at the first messaging station. The first transmission-related time and second transmission-related time may be obtained based on contents of a subsequent FTM frame, M+1.

The configuration of the FTM session as an immediate, single-burst FTM session (ASAP=1, burst exponent=0) may be requested by one of the first and second messaging stations and not subject to override by the other of the first and second messaging stations. The FTM session may be initiated by an FTM request message, and the configuration of the FTM session as an immediate, single-burst FTM session (ASAP=1, burst exponent=0) may be indicated by a bit in a trigger field in the FTM request message. According to an embodiment, at least one of the captured packetized FTM messages utilizes a modified FTM frame format. The modified FTM frame format may replace a plurality of information element (IE) parameter fields with a plurality of new fields. The plurality of new fields may include one or more of a Max Burst Duration field, a Min Delta FTM field, a Max FTMs per burst field, a FTM Format and Bandwidth field, a Status field, or a reserved field.

In one embodiment, estimating the position of the observing station involves determining a differential distance corresponding to a difference between (a) a distance between the first messaging station and the observing station and (b) a distance between the second messaging station and the observing station. The differential distance may be determined based on (1) the first time of arrival, (2) the second time of arrival, (3) the first transmission-related time, and (4) the second transmission-related time. The position of the observing station may be determined based on the differential distance, the position of the first messaging station, and the position of the second messaging station.

According to one embodiment, technique for estimating the position of the observing station may further involve obtaining the position of the first messaging station and the position of the second messaging by downloading, from a server, a portion of an almanac comprising a list of messaging stations and corresponding locations. The technique may also involve capturing a plurality of packetized FTM messages exchanged between a second pair of messaging stations. Estimating the position of the observing station may be further based on positions of the second pair of messaging stations, times of arrival, at the observing station, of a first and a second FTM message associated with the second pair of messaging stations, and first and second transmission-related times corresponding to the first and second FTM messages associated with the second pair of messaging stations.

Certain embodiments of the disclosure relate to an apparatus for estimating a position of an observing station. The apparatus may comprise a wireless communication interface configured to capture a plurality of packetized FTM messages exchanged between a pair of messaging stations comprising a first messaging station and a second messaging station. The plurality of packetized FTM messages may include a first FTM message originating from the first messaging station and intended for the second messaging station and further include a second FTM message originating from the second messaging station and intended for the first messaging station. The apparatus may further comprise a processing unit coupled to the wireless communication interface, the processing unit configured to determine, at the observing station, a first time of arrival corresponding to a time at which the first FTM message arrives at the observing station. According to at least one embodiment, the first FTM message is part of an FTM session configured for an immediate, single burst (ASAP=1, burst exponent=0). The processing unit may be further configured to determine, at the observing station, a second time of arrival corresponding to a time at which the second FTM message arrives at the observing station. Also, the processing unit may be configured to obtain, based on contents of one of the plurality of packetized FTM messages, a first transmission-related time associated with transmission or reception of the first FTM message from the first messaging station to the second messaging station. In addition, the processing unit may be configured to obtain, based on contents of one of the plurality of packetized FTM messages, a second transmission-related time associated with transmission or reception of the second FTM message from the second messaging station to the first messaging station. The processing unit may be further configured to estimate the position of the observing station based on (1) a position of the first messaging station, (2) a position of the second messaging station, (3) the first time of arrival, (4) the second time of arrival, (5) the first transmission-related time, and (6) the second transmission-related time.

Certain embodiments of the disclosure relate to a system for estimating a position of an observing station. The system may comprise means for, at the observing station, capturing a plurality of packetized FTM messages exchanged between a pair of messaging stations comprising a first messaging station and a second messaging station. The plurality of packetized FTM messages may include a first FTM message originating from the first messaging station and intended for the second messaging station and further include a second FTM message originating from the second messaging station and intended for the first messaging station. The system may further include means for, at the observing station, determining a first time of arrival corresponding to a time at which the first FTM message arrives at the observing station. In at least one embodiment, the first FTM message is part of an FTM session configured for an immediate, single burst (ASAP=1, burst exponent=0). The system may further include means for, at the observing station, determining a second time of arrival corresponding to a time at which the second FTM message arrives at the observing station. The system may further include means for obtaining, based on contents of one of the plurality of packetized FTM messages, a first transmission-related time associated with transmission or reception of the first FTM message from the first messaging station to the second messaging station. The system may include means for obtaining, based on contents of one of the plurality of packetized FTM messages, a second transmission-related time associated with transmission or reception of the second FTM message from the second messaging station to the first messaging station. The system may include means for estimating the position of the observing station based on (1) a position of the first messaging station, (2) a position of the second messaging station, (3) the first time of arrival, (4) the second time of arrival, (5) the first transmission-related time, and (6) the second transmission-related time.

Certain embodiments of the disclosure relate to a non-transitory computer-readable storage medium comprising machine-readable instructions stored thereon. When executed by one or more processors, the instructions may cause the one or more processors to perform various steps. The instructions may cause the one or more processors to, at an observing station, facilitate capturing of a plurality of packetized FTM messages exchanged between a pair of messaging stations comprising a first messaging station and a second messaging station. The plurality of packetized FTM messages may include a first FTM message originating from the first messaging station and intended for the second messaging station and further include a second FTM message originating from the second messaging station and intended for the first messaging station. The instructions may cause the one or more processors to, at the observing station, determine a first time of arrival corresponding to a time at which the first FTM message arrives at the observing station. In at least one embodiment, the first FTM message is part of an FTM session configured for an immediate, single burst (ASAP=1, burst exponent=0). The instructions may cause the one or more processors to, at the observing station, determine a second time of arrival corresponding to a time at which the second FTM message arrives at the observing station. The instructions may cause the one or more processors to obtain, based on contents of one of the plurality of packetized FTM messages, a first transmission-related time associated with transmission or reception of the first FTM message from the first messaging station to the second messaging station. The instructions may cause the one or more processors to obtain, based on contents of one of the plurality of packetized FTM messages, a second transmission-related time associated with transmission or reception of the second FTM message from the second messaging station to the first messaging station. The instructions may cause the one or more processors to estimate the position of the observing station based on (1) a position of the first messaging station, (2) a position of the second messaging station, (3) the first time of arrival, (4) the second time of arrival, (5) the first transmission-related time, and (6) the second transmission-related time.

BRIEF DESCRIPTION OF THE DRAWINGS

FIG. 4 illustrates new FTM parameters that can be adopted in the context of a new frame format, in accordance with certain embodiments of the disclosure;

FIG. 5A illustrates the placement of a new passive positioning FTM parameters element within a field in an FTM request message;

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Passive Positioning

Figure 1:
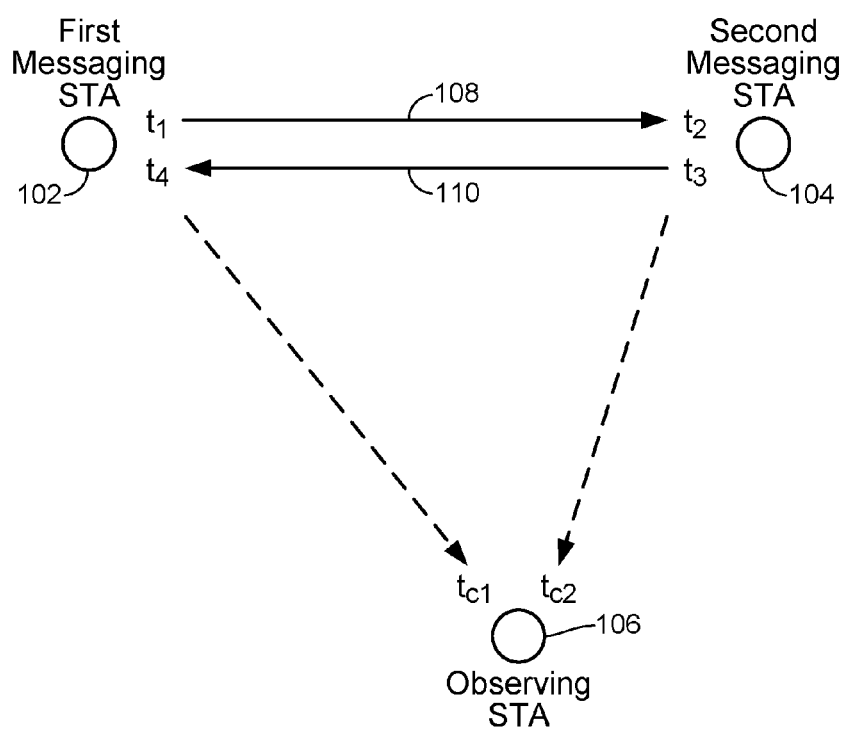
FIG. 1 is a simplified diagram of a system that includes the basic entities involved in a passive position determination technique, according to embodiments of the present disclosure.

FIG. 1 is a simplified diagram of a system 100 that includes the basic entities involved in a passive position determination technique, according to embodiments of the present disclosure. System 100 is shown to include a first messaging station 102, a second messaging station 104, and an observing station 106. Here, the term "station" broadly refers to a device that is capable of sending and/or receiving messages via a communication protocol with one or more other devices. A station may be stationary (e.g., base station) or movable (e.g., mobile station). A station may have a designated role, depending on the communication protocol used. For example, in a wireless local area network, one station may take on the role of an access point (AP), and another station may take on the role of a client served by the AP. As used in the present disclosure, a "messaging station" refers to a station that is involved in an exchange of messages with one or more other stations. Generally speaking, the messages are composed of packets of data. Each packet of data may have a certain structure, such as a frame structure, with multiple bit fields within each frame. As shown in the figure, the first messaging station 102 and the second messaging station 104 are involved in an exchange of messages with one another. Here, the exchange of messages includes a first packetized message 108 transmitted from the first messaging station 102 to the second messaging station 104. The first packetized message 108 is associated with a time of departure (ToD) of $t_1$ from the first messaging station 102 and a time of arrival (ToA) of $t_2$ at the second messaging station 104. The exchange of messages also includes a second packetized message 110 transmitted from the second messaging station 104 to the first messaging station 102. The second packetized message 110 is associated with a ToD of $t_3$ from the second messaging station 104 and a ToA of $t_4$ at the first messaging station 102. According to various embodiments of the disclosure, one or more of these times of arrival and/or departure may be used in a passive positioning technique employed by an observing station.

As shown in FIG. 1, the observing station 106 is not involved in the exchange of messages between the first messaging station 102 and the second messaging station 104. Instead, the observing station 106 is merely "listening in" on the exchange of messages. For example, the observing station 106 captures the first packetized message 108 transmitted by messaging station 102 and intended for messaging station 104. The observing station 106 also captures the second packetized message 110 transmitted by messaging station 104 and intended for messaging station 102. In certain embodiments, messaging stations transmit in a non-directional manner. Thus, any device within a certain range may be able to capture a packetized message that is sent and intended for a particular targeted device. In other embodiments, messaging stations transmit in a directional manner. However, even in that case, the directional transmission may still reach other devices in the general direction or vicinity of the target device. Thus, in non-directional and even some directional transmission scenarios, an observing station such as station 106 may be able to capture packetized messages exchanged between messaging stations such as stations 102 and 104. As shown in FIG. 1, the first packetized message 108 reaches the observing station at a ToA of $t_{c1}$. The second packetized message 110 reaches the observing station at a ToA of $t_{c2}$. The observing station 106 may record both $t_{c1}$ and $t_{c2}$ and utilize these values in performing passive positioning.

According to embodiments of the disclosure, passive positioning techniques employ the concept of "differential distance" in determining the position of the observing station 106. Here, the differential distance may represent the difference between (1) the distance between the first messaging station 102 and the observing station 106 and (2) the distance between the second messaging station 104 and the observing station 106. In the context of Fine Timing Measurement (FTM) messages, which will be explained in more detail below, a differential distance may be expressed as follows:

$$D_{SR} = C \times (T_{SO} - T_{RO})$$

where c is the speed of light.

$T_{SO}$ is the time of flight between the responding station (STA) (e.g., first messaging station 102) and the observing station (e.g., station 106)

$T_{RO}$ is the time of flight between the initiating station (STA) (e.g., second messaging station 104) and the observing station (e.g., station 106)

The values $T_{SO}$ and $T_{RO}$ can be determined based on various times of arrival (ToA) and times of departure (ToD) of relevant signals. For example, $T_{SO}$ and $T_{RO}$ may be determined as:

$$T_{SO} = t_{c1} - t_1$$

$$T_{RO} = t_{c2} - t_3 = t_{c2} - (t_4 - T)$$

where T is the time of flight between the responding STA and the initiating STA. The value of T may be found in various ways. Just as an example, given the known positions of responding STA (e.g., first messaging station 102) and the initiating STA (e.g., second messaging station 104), the distance T between the two messaging stations can be determined.

Thus, the differential distance can be expressed in terms of various times of arrival and times of departure. For example:

$$D_{SR}=c \times (t_{c1}-t_{c2}T-(t_1-t_4))$$

According to embodiments of the disclosure, the observing station 106 may record the times of arrival $t_{c1}$ and $t_{c2}$ on its own. The observing station 106 may also extract certain times of arrival and times of departure, such as $t_1$ and $t_4$, from the contents of the packetized messages exchanged between the messaging stations.

A differential distance, such as described above, serves as a basis for determining the position of the observing station 106. Given the known positions of a pair of messaging stations and the differential distance from the observing station to the pair of messaging stations, a hyperbolic curve can be determined that represents the possible positions of the observing station 106. The same technique can be repeated with another pair of messaging stations and the same observing station 106, to yield a different hyperbolic curve representing possible positions of the observing station 106. The intersection of the two hyperbolic curves can be determined as the estimated position of the observing station 106. The technique can be repeated using one or more additional pairs of messaging stations to yield additional hyperbolic curve(s). Determining the intersection of the multiple curves may increase the accuracy of the estimated position.

The positions of the pair of messaging stations 102 and 104 may be obtained by the observing station 106 by downloading, e.g., from a server, a portion of an almanac comprising a list of messaging stations and their corresponding positions. Such a server may be, for example, a location server and/or an almanac server. Messaging stations 102 and 104 may be cellular network base stations, access points (APs), and/or the like, and the almanac maintained at one or more servers may contain location information relating to the known positions of each messaging station.

Fine Timing Measurement (FTM) Context

Figure 2:
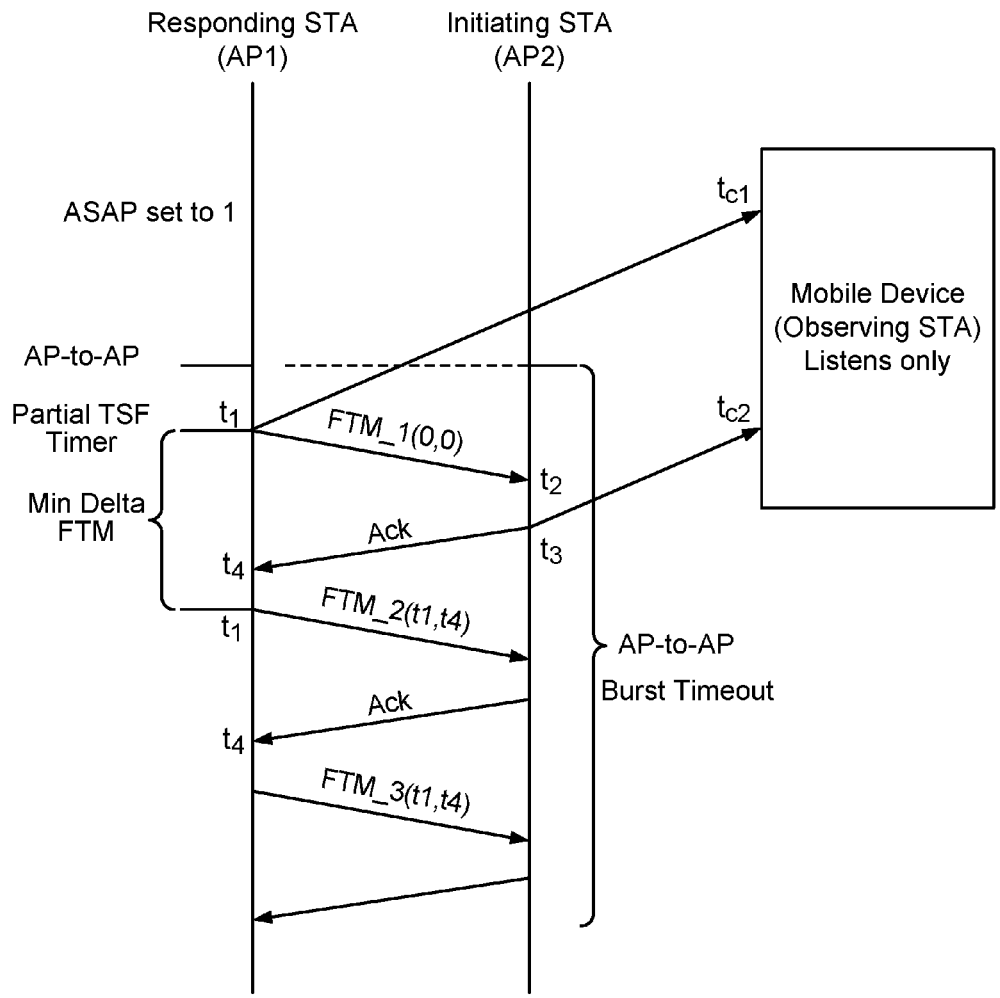
FIG. 2 is a signal diagram showing examples of Fine Timing Measurement (FTM) frames used in passive positioning, in accordance with certain embodiments of the disclosure.

FIG. 2 is a signal diagram showing examples of Fine Timing Measurement (FTM) messages used in passive positioning, in accordance with certain embodiments of the disclosure. Traditionally, FTM messages are used to perform ranging between a pair of messaging stations, i.e., to find the distance between the two messaging stations. An FTM session may be initiated by an initiating STA, which sends an FTM request message (not shown) to a responding STA. In response, the responding STA may send an FTM frame, such as FTM_1 (M=1) shown in the figure, to the initiating STA. The FTM frame (M=1) is associated with a time of departure (ToD) of $t_1$ from the responding STA and a time of arrival (ToA) of $t_2$ at the initiating STA. Thereafter, the initiating STA may send an FTM acknowledgment (ACK) message back to the responding STA. The ACK message is associated with a ToD of $t_3$ from the initiating STA and a ToA of $t_4$ at the responding STA. The basic exchange of an FTM frame followed by an ACK message represents the basis of an FTM session.

An FTM session may comprise of more than one round of exchange of FTM frame and ACK message. Typically, an FTM session comprises one or more bursts of such exchanges. Just as an example, in FIG. 2, a particular burst is shown to include three rounds FTM and ACK exchanges. These exchanges involve FTM frame (M=1) and its corresponding ACK message, FTM frame (M=2) and its corresponding ACK message, and FTM frame (M=3) and its corresponding ACK message.

Transmission-related times ToD and ToA, such as $t_1$, $t_2$, $t_3$, and/or $t_4$, may be communicated as part of the contents of the various FTM frames and ACK messages. ToA and ToD values recorded for one FTM frame may be communicated in a subsequent FTM frame. For example, timestamps $t_1$ and $t_4$ are determined at the Responding STA. The $t_1$ and $t_4$ values measured for a particular FTM frame, M, may be communicated in a subsequent FTM frame, M+1, from the Responding STA to the Initiating STA.

According to embodiments of the disclosure, passive positioning takes advantage of the existing structure and functionality of FTM frames exchanged between an initiating STA and a responding STA. The measurement of transmission-related times, such as t1 and t4, and the communication of these values inside the contents of FTM frames represent functionality that already exists in FTM sessions. By merely listening in on FTM exchanges and taking advantage of the existing FTM structure and functionality, an observing STA may determine its own position without actively participating in any on-going FTM exchanges between initiating STA(s) and responding STA(s).

The relationship between the messaging stations, such as initiating STA and responding STA, and the observing STA may differ depending on implementation. In one example, the relationship is that of access points (APs) serving mobile devices as clients in a wireless local area network (WLAN). Thus, the initiating STA may be one AP, and the responding STA may be another AP, while the observing STA may be a mobile device that is served by one or both of the APs. That is, the mobile device may rely on the APs as the points of access to a larger data network. In another example, the initiating STA and responding STA may not take on the role of APs. Instead, the initiating STA and responding STA may be dedicated only to the exchange of messages used for passive positioning and do not act as APs serving the role of providing mobile devices with access to a larger data network.

Passive positioning, such as that described above in the context of an FTM implementation, has significant advantages over traditional positioning techniques that require active transmission and reception of positioning signals. One advantage is privacy. The observing STA merely listens in on exchanges of messages between messaging stations, without actively participating in such exchanges. Thus, the observing STA does not need to provide its identity or other information, which is typically required in establishing a message exchange. The initiating STA and responding STA may not even be aware of the existence of the observing STA. Thus, the observing STA enjoys a high degree of privacy when performing passive positioning. Another advantage is power consumption. Because the observing STA only needs to listen in on existing message exchanges, the observing STA does not expend battery resources in establishing message exchanges. The observing STA can realize significant power savings over traditional positioning techniques that require the active exchange, including transmission, of positioning signals. Yet another advantage is scalability. Passive positioning can allow for virtually an unlimited number of observing STAs to simultaneously perform positioning, by listening to the exchanges of messages among a limited number of messaging stations. Because the observing stations are merely listening, they do not represent an additional processing burden placed on the messaging stations. For example, if the mobile devices of 100,000 sports fans in a stadium are simultaneously trying to obtain position information, all of the mobile devices may be able to perform passive positioning without scalability issues. In fact, a number of messaging stations can be set up (e.g., multiple pairs of messaging stations) to exchange messages, e.g., FTM frames, and all the mobile devices can perform passive positioning by listening in on the exchanged messages without overtaxing the capabilities of the messaging stations. Each additional mobile station that listens in on the exchange of messages does not represent an additional processing burden, from the perspective of the messaging devices. Therefore, passive positioning is extremely well suited to scale up the number of observing stations.

Scheduled Passive Positioning

According to certain embodiments of the disclosure, it may be advantageous to schedule the exchange of messages that are used by the observing STA. As discussed, in certain scenarios, the initiating STA and responding STA may also serve as APs to provide network access to mobile devices. Specifically, the initiating STA may serve a group of clients, e.g., mobile devices, by communicating with those clients on a particular communication channel (e.g., a first frequency channel). The responding STA may serve another group of clients by communicating with those clients on another communication channel (e.g., a second frequency channel). In at least one implementation, an FTM session is established on a common communication channel. That is, the initiating STA and the responding STA must agree to operate on a common communication channel over which the FTM frames are exchanged. For example, the initiating STA may have to transition over to the communication channel currently used by the responding STA, or vice versa. Such a transition may be burdensome on the clients of the STA (serving as the AP) that makes the transition. That is, clients that were being served on a particular communication channel may no longer be able to find their AP on that channel—because the AP has transitioned to a different communication channel. Steps may need to be taken to warn, transition, or otherwise assist the clients in dealing with such a transition.

To better handle such complications, messaging STAs that serve as APs may exchange messages, such as FTM frames, based on a defined schedule. A defined schedule provides predictability and makes it possible for APs to transition to a new communication channel at defined time slots, thereby limiting the impact on their associated client devices. A defined schedule also enables the observing STAs to align to the schedule when capturing the exchanged messages. For example, an observing STA may "wake up" at the start of the appropriate time slot in order to be able to timely receive one or more packetized messages (e.g., FTM frames and ACK messages) exchanged between messaging STAs.

Parameters of Negotiation

According to certain embodiments, messaging STAs may also negotiate parameters associated with the exchange of messages. Each STA, which may serve as an AP to its own group of client devices, may have specific needs and constraints. For example, one messaging STA may propose a particular schedule for a message exchange, e.g., one or more FTM bursts. However, the proposed schedule may not be suitable or desirable from the perspective of the other messaging STA. Thus, by allowing the messaging STAs to negotiate parameters, it may be possible for the messaging STAs to agree on a particular set of parameters for the exchange of messages that is satisfactory to both entities. In various embodiments, one or more of the following parameters may be negotiated. These parameters should be understood as being illustrative in nature and not exhaustive:

Length/duration of the passive positioning session
Response time
Spacing between each frame
Maximum number of successful frames to be exchanged in the session
Format of the frames (e.g., bandwidth, preamble, etc.)

Deterministic Passive Positioning Sessions

According to certain embodiments, a deterministic passive positioning session is adopted, which can ease the process of scheduling and limit power consumption at the observing STA. While there are advantages to allowing the messaging STAs to have flexibility in negotiating the manner in which the exchange of messages is to take place, too much flexibility may lead to inefficient implementations. For example, the existing structure of FTM frames allows for the option to delay the message exchange, by controlling an "ASAP" parameter:

ASAP=1 (FTM burst starts immediately following FTM request message)
ASAP=0 (FTM burst is delayed and starts at time TSF)

In addition, as discussed previously, each FTM session may comprise one or more bursts. Each burst may comprise one or more FTM frames (and corresponding ACK messages). The number of bursts in an FTM session may be controlled using a "burst exponent" parameter (n):

n=burst exponent
$2^n$=number of bursts in the FTM session

In some embodiments, an immediate, single burst of messages is chosen as a particularly useful configuration of a deterministic passive positioning session. In the context of FTM frames, the ASAP parameter may be set to 1 (ASAP=1), and the burst exponent may be set to 0 (n=0). Using a single burst limits the impact on respective client devices of each messaging STA. A single burst is also sufficient for purposes of exchanging enough messaging frames to be captured by the observing STA and used for passive positioning. Therefore, a single burst is a suitable choice for bounding the extent of the FTM session.

Furthermore, guidelines may be put in place to constrain the actions of the messaging STAs. For example, one guideline may dictate that, once an initiating STA sends an FTM request message with ASAP=1 and burst exponent n=0, the responding STA is prohibited from overriding the ASAP=1 and burst exponent n=0 parameters. In this example, the responding STA may be constrained such that it is not allowed to override the immediate, single-burst nature of the proposed FTM session. However, the responding STA may still exercise some degree of control, because it can decide to either participate or not participate in the proposed FTM session. Thus, a balance is achieved, by providing a deterministic passive positioning session that is associated with ease of scheduling and relatively low power consumption.

Modifications to FTM Frame Format

Figure 3:
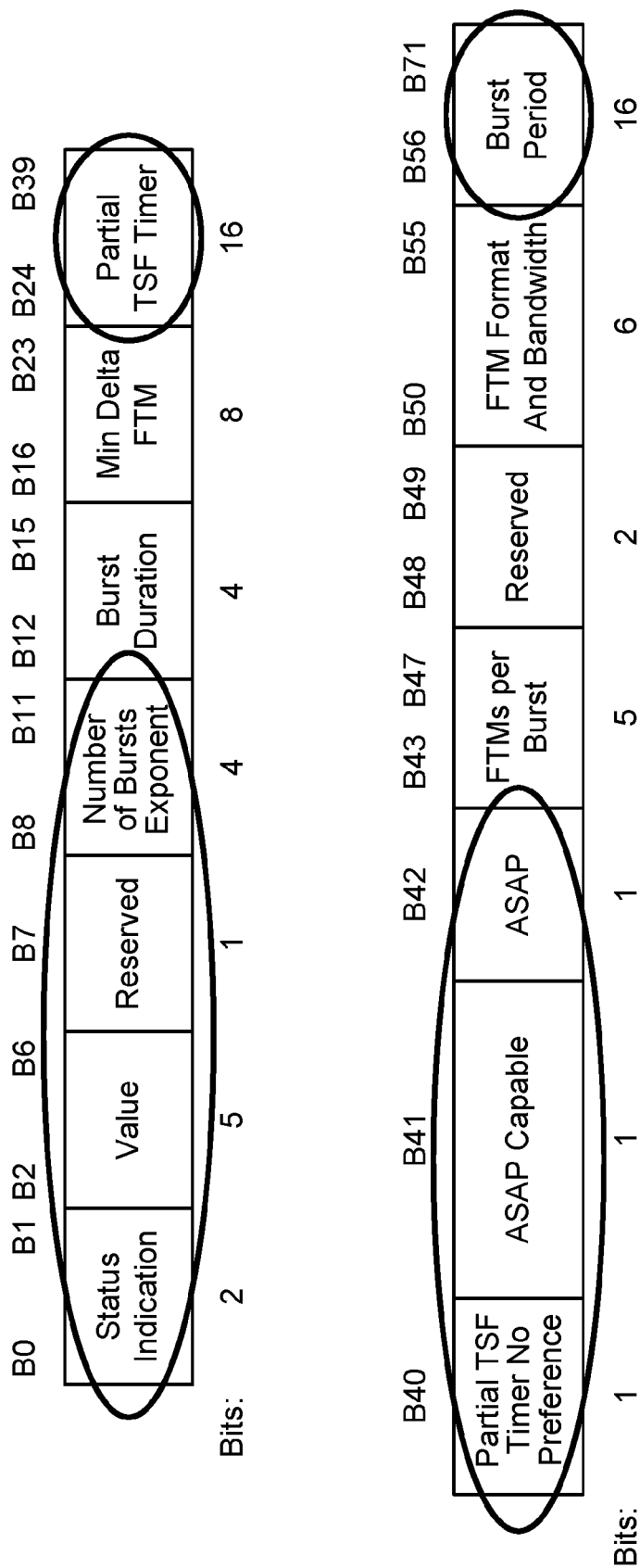
FIG. 3 illustrates a modified FTM frame format that replaces certain fields and is suitable for a deterministic FTM session having an immediate, single burst of frames.

FIG. 3 illustrates a modified FTM frame format that replaces certain fields and is suitable for a deterministic FTM session having an immediate, single burst of frames. To facilitate passive positioning that achieves the previously discussed attributes of determinism, flexibility, and well-defined schedules, certain modifications may be made to the currently existing FTM frame format. Some of these modifications are described below.

First, a bit in the FTM request message may be used to signal the mandate to adhere to an immediate, single-burst FTM session. For example, the Trigger field in the FTM request message (e.g., as shown in FIG. 5A) has bits 0-7 reserved (i.e., values 0-255 reserved). One of the reserved bits can be used to indicate a request for an immediate, single burst of FTM frames. That is, when set, the single bit may be used to represent a request for setting the parameters ASAP=1 and burst exponent=0. When set, the same bit may also indicate that the configuration of ASAP=1 and burst exponent=0 is not to be overridden. In other words, the initiating STA is proposing a specific type of FTM session, and the responding STA is not free to modify the immediate, single-burst nature of the proposed FTM session.

Second, by adopting such a deterministic approach, certain fields within the existing FTM frame format may no longer be needed, because they were originally intended as fields that specify certain parameters that are now obsolete. For example, if it is "understood" that the FTM session is to have an immediate, single burst, i.e., ASAP=1, and burst exponent=0, it is no longer necessary for the FTM frame to include fields for expressing values such as the number of burst exponents, partial TSF timer (for indicating amount of delay before the FTM burst), ASAP, etc.

Referring to FIG. 3, the figure illustrates the existing fields of an FTM frame format, according to Section 9.4.2.168 of the 802.11REVmc D6.0 standard. In particular, the frame format contains FTM information element (IE) parameters, which includes certain fields that become unnecessary and thus can be replaced:

Status Indication (B0-B1)
Value (B2-B6)
Reserved (B7)
Number of Burst Exponent (B8-B11)
Partial TSF Timer (B24-B39)
Partial TSF Timer No Preference (B40)
ASAP Capable (B41)
ASAP (B42)
Burst Period (B56-B71)

FIG. 4 illustrates new FTM parameters that can be adopted in the context of a new frame format, in accordance with certain embodiments of the disclosure. For passive positioning, a new FTM parameters element may be implemented. The element may be referred to as "passive positioning FTM parameters element." The new element may have an IE id. The IE id. of the new element may be specified using a reserved field from Table 9-77 (e.g., 222-254) in the 802.11REVmc draft D6.0 standard.

FIG. 5A illustrates the placement of a new passive positioning FTM parameters element within a field in an FTM request message. As shown in the figure, the new passive positioning FTM parameters element ("Fine Timing Measurement Parameters") may be placed in a variable length field within the frame format of the FTM request message.

Figure 5B:
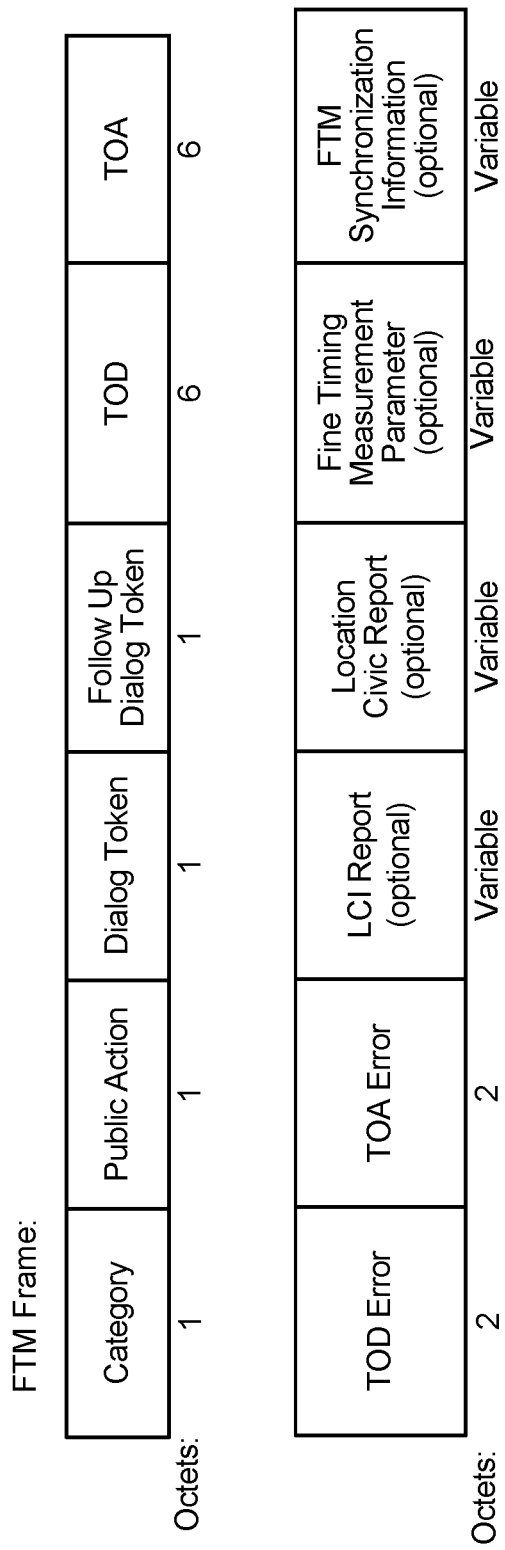
FIG. 5B illustrates the placement of the new passive positioning FTM parameters element within a field in an FTM frame.

FIG. 5B illustrates the placement of the new passive positioning FTM parameters element within a field in an FTM frame. As shown in the figure, the same new passive positioning FTM parameters element ("Fine Timing Measurement Parameters") may be placed in a variable length field within the frame format of the FTM frame.

Figure 6:
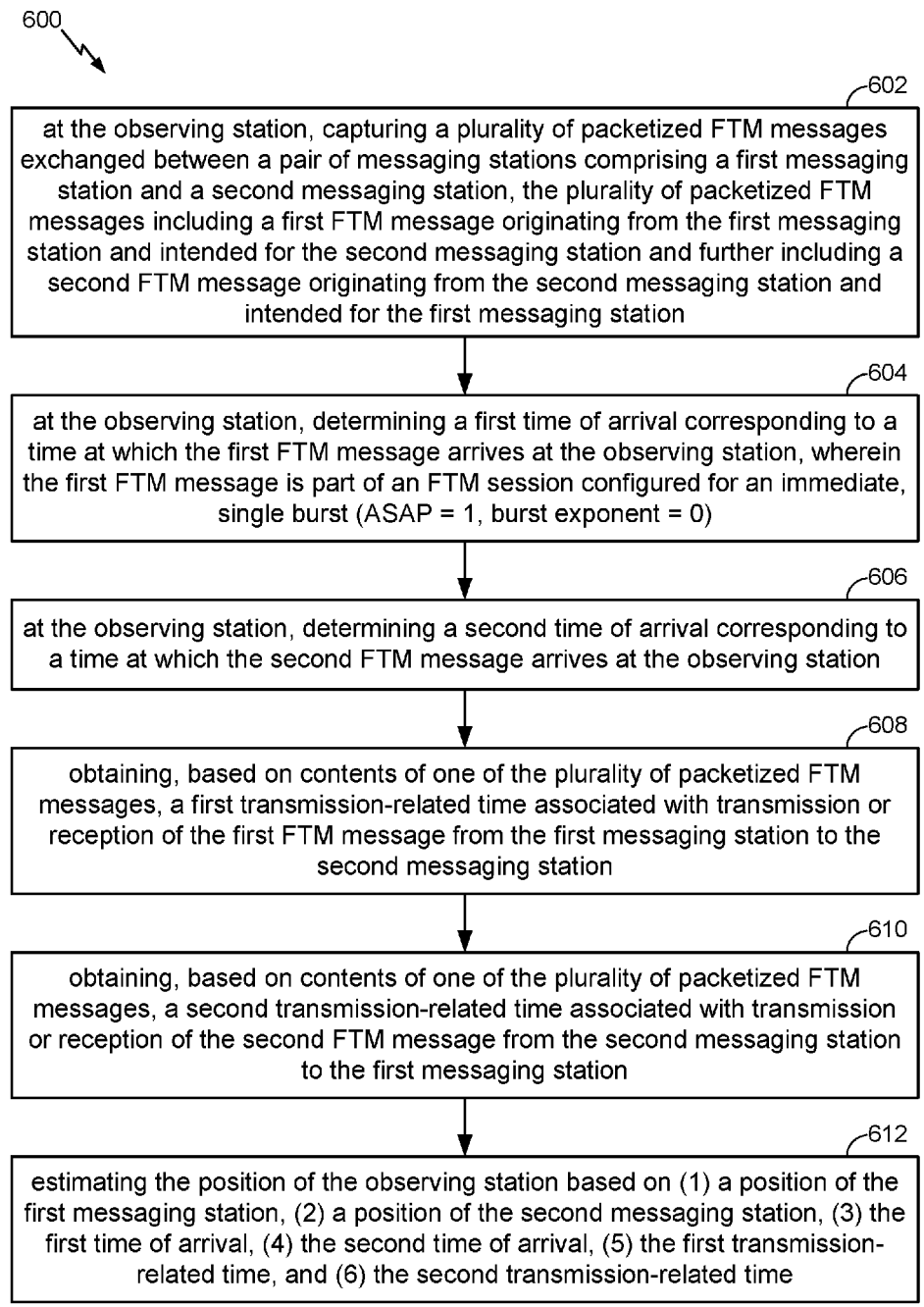
FIG. 6 is a flow chart depicting a process for estimating a position of an observing station, according to an embodiment of the disclosure.

FIG. 6 is a flow chart depicting a process 600 for estimating a position of an observing station, according to an embodiment of the disclosure. As shown, at step 602, the process involves, at the observing station, capturing a plurality of packetized FTM messages exchanged between a pair of messaging stations comprising a first messaging station and a second messaging station. The plurality of packetized FTM messages may include a first FTM message originating from the first messaging station and intended for the second messaging station and further include a second FTM message originating from the second messaging station and intended for the first messaging station. Examples of the observing station, first messaging station, and second messaging station may be observing station 106, the first messaging station 102, and the second messaging station 104, respectively, as shown in FIG. 1. The first FTM message may be, for example, message 108 transmitted from the first messaging station to the second messaging station. The second FTM message may be, for example message 110 transmitted from the second messaging station to the first messaging station.

At step 604, at the observing station, the process involves determining a first time of arrival (e.g., $t_{c1}$) corresponding to a time at which the first FTM message arrives at the observing station, wherein the first FTM message is part of an FTM session configured for an immediate, single burst (ASAP=1, burst exponent=0). At step 606, at the observing station, the process involves determining a second time of arrival (e.g., $t_{c2}$) corresponding to a time at which the second FTM message arrives at the observing station. At step 608, the process involves obtaining, based on contents of one of the plurality of packetized FTM messages, a first transmission-related time (e.g., $t_1$) associated with transmission or reception of the first FTM message from the first messaging station to the second messaging station. At step 610, the process involves obtaining, based on contents of one of the plurality of packetized FTM messages, a second transmission-related time (e.g., $t_4$) associated with transmission or reception of the second FTM message from the second messaging station to the first messaging station. At step 612, the process involves estimating the position of the observing station based on (1) a position of the first messaging station, (2) a position of the second messaging station, (3) the first time of arrival (e.g., $t_{c1}$), (4) the second time of arrival (e.g., $t_{c2}$), (5) the first transmission-related time (e.g., $t_1$), and (6) the second transmission-related time (e.g., $t_4$).

According to certain embodiments, the steps depicted in process 600 may all be performed at the observing station. For example, the observing station may capture the first and second FTM messages and obtain, based on contents of one of the plurality of packetized FTM messages in the FTM session, the transmission-related times associated with the first and second FTM messages. The observing station may also estimate the position of the observing station based on the known locations of the first and second messaging stations, the first and second times of arrival, and the first and second transmission-related times. In other embodiments, however, some of the steps depicted in process 600 may be performed at the observing station, while other steps are performed elsewhere. For example, the observing station may capture the first and second FTM messages and obtain, based on contents of one of the plurality of packetized FTM messages, the transmission-related times associated with the first and second packetized messages. However, another entity, such as remote server, may estimate the position of the observing station based on the known locations of the first and second messaging stations, the first and second times of arrival, and the first and second transmission-related times.

Figure 7:
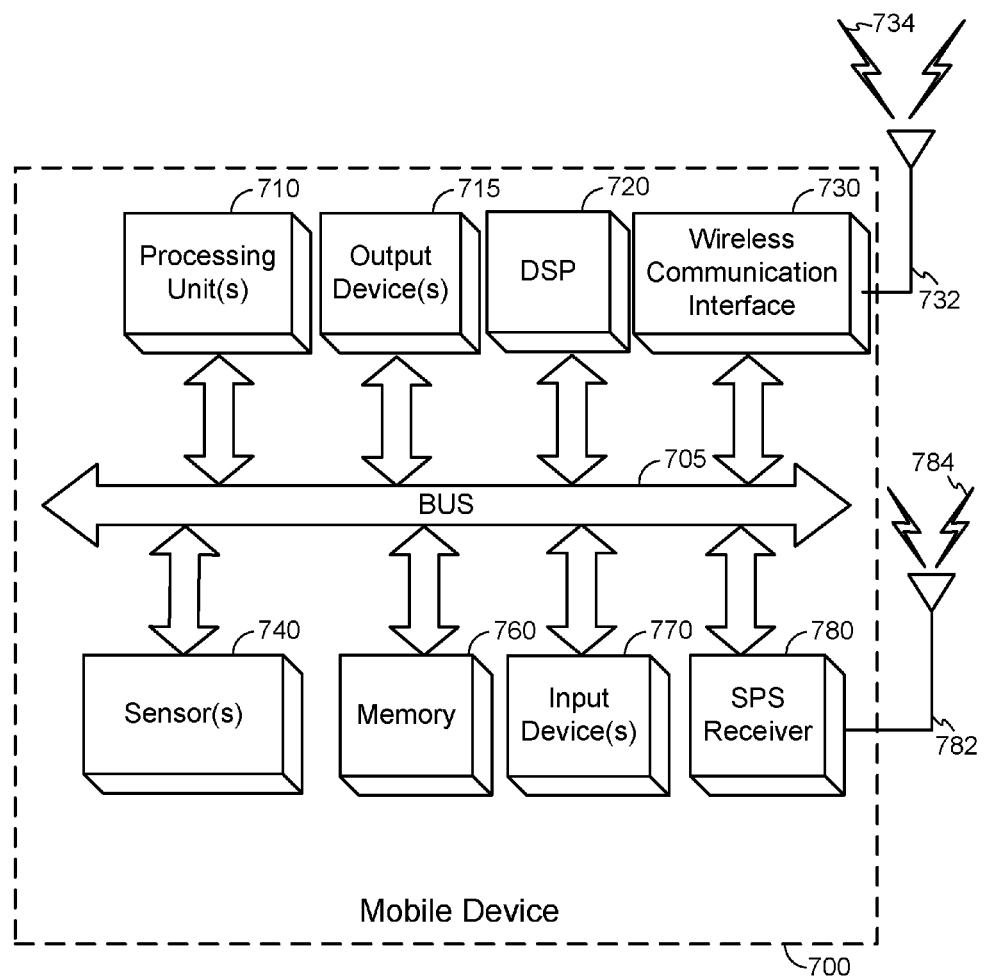
FIG. 7 illustrates an embodiment of the observing station 106, as a mobile device 700, which can be utilized as described herein above.

FIG. 7 illustrates an embodiment of the observing station 106, as a mobile device 700, which can be utilized as described herein above. For example, the mobile device 700 can listen in on the exchange of messages between messaging stations 102 and 104 shown in FIG. 1 and perform passive positioning as described with respect to FIG. 1 through 6. It should be noted that FIG. 7 is meant only to provide a generalized illustration of various components, any or all of which may be utilized as appropriate.

The mobile device 700 is shown comprising hardware elements that can be electrically coupled via a bus 705 (or may otherwise be in communication, as appropriate). The hardware elements may include a processing unit(s) 710 which may comprise, without limitation, one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 7, some embodiments may have a separate DSP 720, depending on desired functionality. The mobile device 700 also may comprise one or more input devices 770, which may comprise without limitation one or more touch screens, touch pads, microphones, buttons, dials, switches, and/or the like; and one or more output devices 715, which may comprise without limitation, one or more displays, light emitting diodes (LEDs), speakers, and/or the like.

The mobile device 700 might also include a wireless communication interface 730, which may comprise without limitation a modem, a network card, an infrared communication device, a wireless communication device, and/or a chipset (such as a Bluetooth device, an IEEE 802.11 device, an IEEE 802.15.4 device, a Wi-Fi device, a WiMAX device, cellular communication facilities, etc.), and/or the like. The wireless communication interface 730 may permit data to be communicated with a network, wireless access points, other computer systems.

For example, in the context of wireless local area network (WLAN) data communications, wireless communication interface 730 may support communication between the mobile device 700 and one or more access points (APs). In the context of passive positioning, wireless communication interface 730 may be used by mobile device 700 to capture packetized messages exchanged between the messaging stations 102 and 104 shown in FIG. 1. The communication can be carried out via one or more wireless communication antenna(s) 732 that send and/or receive wireless signals 734.

Depending on desired functionality, the wireless communication interface 730 may comprise separate transceivers to communicate with base transceiver stations and other wireless devices and access points. The communication may be take place over different network types, including but not limited to a WLAN, wireless wide area network (WWAN), etc. Such networks may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 1002.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN, and/or WPAN.

The mobile device 700 can further include sensor(s) 740. Such sensors may comprise, without limitation, one or more accelerometer(s), gyroscope(s), camera(s), magnetometer(s), altimeter(s), microphone(s), proximity sensor(s), light sensor(s), and the like. Some or all of the sensor(s) 740 can be utilized, among other things, for dead reckoning and/or other positioning methods. Such positioning methods may be used to independently or in combination with other devices and operations, including passive positioning as described herein, to determine or update a position of the mobile device 700.

Embodiments of the mobile device 700 may also include an SPS receiver 780 capable of receiving signals 784 from one or more SPS satellites using an SPS antenna 782. Such positioning can be utilized to complement and/or incorporate the techniques described herein. The SPS receiver 780 can extract a position of the mobile device, using conventional techniques, from SPS space vehicles (SVs) of an SPS system, such as GNSS (e.g., Global Positioning System (GPS)), Galileo, GLONASS, Compass, Quasi-Zenith Satellite System (QZSS) over Japan, Indian Regional Navigational Satellite System (IRNSS) over India, Beidou over China, and/or the like. Moreover, the SPS receiver 780 can be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 700 may further include and/or be in communication with a memory 760. The memory 760 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 760 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 700 (and/or a processing unit within the mobile device 700, and/or another device of a positioning system). In an aspect, then, such code and/or instructions can be used to configure and/or adapt a general-purpose computer (or other device) to perform one or more operations in accordance with the described methods.

Figure 8:
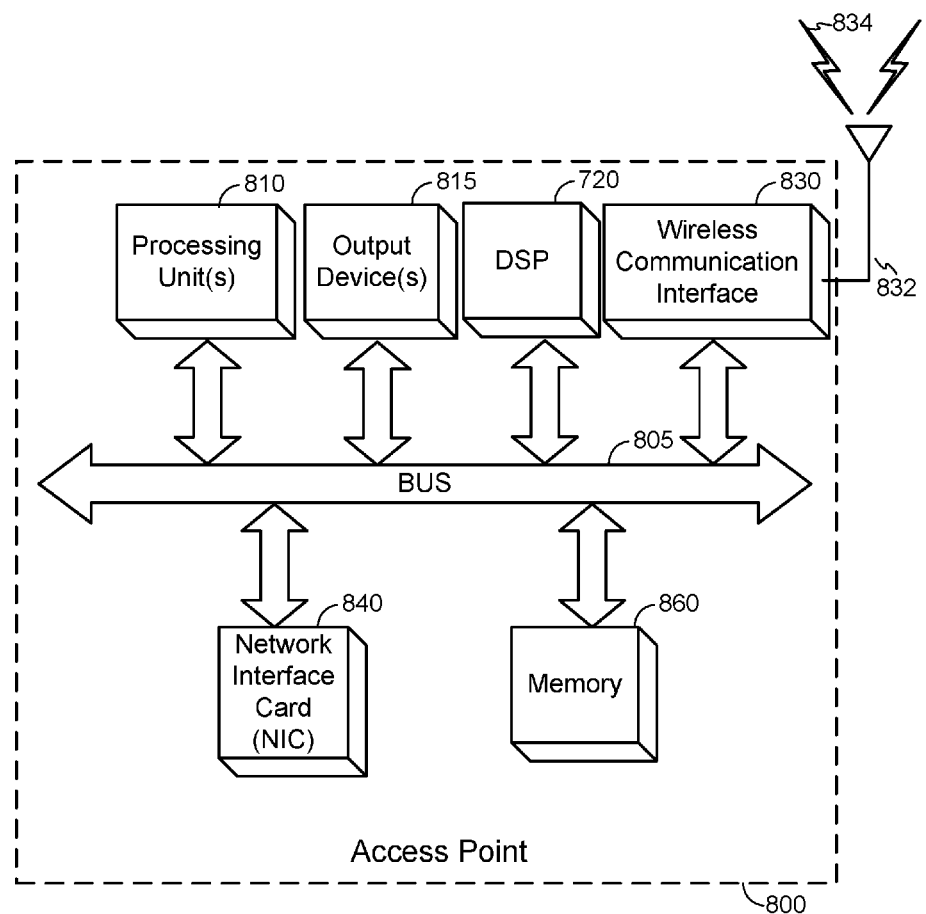
FIG. 8 illustrates an embodiment of the messaging stations 102 and 104, as an access point (AP) 800, which can be utilized as described herein above.

FIG. 8 illustrates an embodiment of the messaging stations 102 and 104, as an access point (AP) 800, which can be utilized as described herein above. As described previously, the messaging stations 102 and 104 are involved in the exchange of messages, which are captured by the observing device 106, to perform passive positioning as described with respect to FIG. 1 through 6. FIG. 8 is meant only to provide a generalized illustration of various components, any or all of which may be utilized as appropriate.

The access point 800 is shown comprising hardware elements that can be electrically coupled via a bus 805 (or may otherwise be in communication, as appropriate). The hardware elements may include a processing unit(s) 810 which may comprise, without limitation, one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 8, some embodiments may have a separate DSP 820, depending on desired functionality. The access point 800 also may comprise one or more output devices 815, which may comprise without limitation, one or more displays, light emitting diodes (LEDs), speakers, and/or the like.

The access point 800 might also include a wireless communication interface 830, which may comprise without limitation a modem, a network card, an infrared communication device, a wireless communication device, and/or a chipset (such as a Bluetooth device, an IEEE 802.11 device, an IEEE 802.15.4 device, a Wi-Fi device, a WiMAX device, cellular communication facilities, etc.), and/or the like. The wireless communication interface 830 may permit data to be communicated with a network, wireless access points, other computer systems.

For example, in the context of wireless local area network (WLAN) data communications, wireless communication interface 830 may support communication between the access point 800 and one or more client devices, such as mobile device 700. In the context of passive positioning, wireless communication interface 830 may be used by access point 800 to exchange messages with other access points, as demonstrated by the exchange of messages between the messaging stations 102 and 104 shown in FIG. 1. The communication can be carried out via one or more wireless communication antenna(s) 832 that send and/or receive wireless signals 834.

Depending on desired functionality, the wireless communication interface 830 may comprise separate transceivers to communicate with client devices and other access points. The communication may take place over different network types, including but not limited to a WLAN, wireless wide area network (WWAN), etc. Such networks may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 1002.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN, and/or WPAN.

Embodiments of the access point 800 may also include a wired communication interface, such as a network interface card (NIC) 840, for connecting to a larger network, e.g., the Internet, and/or a backhaul. In an upstream direction, access point 800 may use a wired communication interface such as NIC 840 to forward packetized messages received from client devices, such as mobile device 700, to the larger network and/or backhaul. Similarly, in a downstream direction, access point 800 may use the wired communication interface to forward packetized messages received from the larger network and/or backhaul to client devices, such as mobile device 700.

The access point 800 may further include and/or be in communication with a memory 860. The memory 860 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 860 of the access point 800 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the access point 800 (and/or a processing unit within the access point 800, and/or another device of a positioning system). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. With reference to the appended figures, components that may comprise memory may comprise non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for estimating a position of an observing station, comprising:
   at the observing station, capturing a plurality of packetized Fine Timing Measurement (FTM) messages exchanged between a pair of messaging stations comprising a first messaging station and a second messaging station, the plurality of packetized FTM messages including a first FTM message originating from the first messaging station and intended for the second messaging station and further including a second FTM message originating from the second messaging station and intended for the first messaging station;
   at the observing station, determining a first time of arrival corresponding to a time at which the first FTM message arrives at the observing station, wherein the first FTM message is part of an FTM session configured for an immediate, single burst by setting an As Soon As Possible (ASAP) parameter to a value of 1 and a burst exponent parameter to a value of 0: (ASAP=1, burst exponent=0);
   at the observing station, determining a second time of arrival corresponding to a time at which the second FTM message arrives at the observing station;
   obtaining, based on contents of one of the plurality of packetized FTM messages, a first transmission-related time associated with transmission or reception of the first FTM message from the first messaging station to the second messaging station;
   obtaining, based on contents of one of the plurality of packetized FTM messages, a second transmission-related time associated with transmission or reception of the second FTM message from the second messaging station to the first messaging station; and
   estimating the position of the observing station based on (1) a position of the first messaging station, (2) a position of the second messaging station, (3) the first time of arrival, (4) the second time of arrival, (5) the first transmission-related time, and (6) the second transmission-related time.

2. The method of claim 1, wherein the first FTM message is an FTM frame, and the second FTM message is an acknowledgement message acknowledging the FTM frame.

3. The method of claim 2,
   wherein the first transmission-related time is a time of departure (ToD) corresponding to transmission of the first FTM message, as a first FTM frame, M, from the first messaging station, and
   wherein the second transmission-related time is a time of arrival (ToA) corresponding to reception of the second FTM message, as an acknowledgement frame for the first FTM frame, M, at the first messaging station.

4. The method of claim 3, wherein the first transmission-related time and second transmission-related time are obtained based on contents of a subsequent FTM frame, M+1.

5. The method of claim 1, wherein the configuration of the FTM session as an immediate, single-burst FTM session (ASAP=1, burst exponent=0) is requested by one of the first and second messaging stations and not subject to override by the other of the first and second messaging stations.

6. The method of claim 1, wherein the FTM session is initiated by an FTM request message, and the configuration of the FTM session as an immediate, single-burst FTM session (ASAP=1, burst exponent=0) is indicated by a bit in a trigger field in the FTM request message.

7. The method of claim 1,
wherein at least one of the captured packetized FTM messages utilizes a modified FTM frame format,
wherein the modified FTM frame format replaces a plurality of information element (IE) parameter fields with a plurality of new fields, and
wherein the plurality of new fields includes one or more of a Max Burst Duration field, a Min Delta FTM field, a Max FTMs per burst field, a FTM Format and Bandwidth field, a Status field, or a reserved field.

8. The method of claim 1, wherein estimating the position of the observing station comprises:
determining a differential distance corresponding to a difference between (a) a distance between the first messaging station and the observing station and (b) a distance between the second messaging station and the observing station;
wherein the differential distance is determined based on (1) the first time of arrival, (2) the second time of arrival, (3) the first transmission-related time, and (4) the second transmission-related time; and
determining the position of the observing station based on the differential distance, the position of the first messaging station, and the position of the second messaging station.

9. The method of claim 1, further comprising:
obtaining the position of the first messaging station and the position of the second messaging by downloading, from a server, a portion of an almanac comprising a list of messaging stations and corresponding locations.

10. The method of claim 1, further comprising:
capturing a plurality of packetized FTM messages exchanged between a second pair of messaging stations;
wherein estimating the position of the observing station is further based on positions of the second pair of messaging stations, times of arrival, at the observing station, of a first and a second FTM message associated with the second pair of messaging stations, and first and second transmission-related times corresponding to the first and second FTM messages associated with the second pair of messaging stations.

11. An apparatus for estimating a position of an observing station, comprising:
a wireless communication interface configured to capture a plurality of packetized Fine Timing Measurement (FTM) messages exchanged between a pair of messaging stations comprising a first messaging station and a second messaging station, the plurality of packetized FTM messages including a first FTM message originating from the first messaging station and intended for the second messaging station and further including a second FTM message originating from the second messaging station and intended for the first messaging station;
a processing unit coupled to the wireless communication interface, the processing unit configured to determine, at the observing station, a first time of arrival corresponding to a time at which the first FTM message arrives at the observing station, wherein the first FTM message is part of an FTM session configured for an immediate, single burst by setting an As Soon As Possible (ASAP) parameter to a value of 1 and a burst exponent parameter to value of 0: (ASAP=1, burst exponent=0);
wherein the processing unit is further configured to determine, at the observing station, a second time of arrival corresponding to a time at which the second FTM message arrives at the observing station;
wherein the processing unit is further configured to obtain, based on contents of one of the plurality of packetized FTM messages, a first transmission-related time associated with transmission or reception of the first FTM message from the first messaging station to the second messaging station;
wherein the processing unit is further configured to obtain, based on contents of one of the plurality of packetized FTM messages, a second transmission-related time associated with transmission or reception of the second FTM message from the second messaging station to the first messaging station; and
wherein the processing unit is further configured to estimate the position of the observing station based on (1) a position of the first messaging station, (2) a position of the second messaging station, (3) the first time of arrival, (4) the second time of arrival, (5) the first transmission-related time, and (6) the second transmission-related time.

12. The apparatus of claim 11, wherein the first FTM message is an FTM frame, and the second FTM message is an acknowledgement message acknowledging the FTM frame.

13. The apparatus of claim 12,
wherein the first transmission-related time is a time of departure (ToD) corresponding to transmission of the first FTM message, as a first FTM frame, M, from the first messaging station, and
wherein the second transmission-related time is a time of arrival (ToA) corresponding to reception of the second FTM message, as an acknowledgement frame for the first FTM frame, M, at the first messaging station.

14. The apparatus of claim 13, wherein the first transmission-related time and second transmission-related time are obtained based on contents of a subsequent FTM frame, M+1.

15. The apparatus of claim 11, wherein the configuration of the FTM session as an immediate, single-burst FTM session (ASAP=1, burst exponent=0) is requested by one of the first and second messaging stations and not subject to override by the other of the first and second messaging stations.

16. The apparatus of claim 11, wherein the FTM session is initiated by an FTM request message, and the configuration of the FTM session as an immediate, single-burst FTM session (ASAP=1, burst exponent=0) is indicated by a bit in a trigger field in the FTM request message.

17. The apparatus of claim 11,
wherein at least one of the captured packetized FTM messages utilizes a modified FTM frame format,
wherein the modified FTM frame format replaces a plurality of information element (IE) parameter fields with a plurality of new fields, and
wherein the plurality of new fields includes one or more of a Max Burst Duration field, a Min Delta FTM field, a Max FTMs per burst field, a FTM Format and Bandwidth field, a Status field, or a reserved field.

18. The apparatus of claim 11, wherein the processing unit is configured, as part of estimating the position of the observing station, to:
determine a differential distance corresponding to a difference between (a) a distance between the first messaging station and the observing station and (b) a distance between the second messaging station and the observing station;

wherein the differential distance is determined based on (1) the first time of arrival, (2) the second time of arrival, (3) the first transmission-related time, and (4) the second transmission-related time; and determining the position of the observing station based on the differential distance, the position of the first messaging station, and the position of the second messaging station.

19. The apparatus of claim 11, wherein the processing unit is further configured to:

obtain the position of the first messaging station and the position of the second messaging by downloading, from a server, a portion of an almanac comprising a list of messaging stations and corresponding locations.

20. The apparatus of claim 11, wherein the wireless communication interface is further configured to capture a plurality of packetized FTM messages exchanged between a second pair of messaging stations; and wherein the processing unit is configured to estimate the position of the observing station, further based on positions of the second pair of messaging stations, times of arrival, at the observing station, of a first and a second FTM message associated with the second pair of messaging stations, and first and second transmission-related times corresponding to the first and second FTM messages associated with the second pair of messaging stations.

21. A system for estimating a position of an observing station, comprising:

means for, at the observing station, capturing a plurality of packetized Fine Timing Measurement (FTM messages exchanged between a pair of messaging stations comprising a first messaging station and a second messaging station, the plurality of packetized FTM messages including a first FTM message originating from the first messaging station and intended for the second messaging station and further including a second FTM message originating from the second messaging station and intended for the first messaging station;

means for, at the observing station, determining a first time of arrival corresponding to a time at which the first FTM message arrives at the observing station, wherein the first FTM message is part of an FTM session configured for an immediate, single burst by setting an As Soon As Possible (ASAP) parameter to a value of 1 and a burst exponent parameter to value of 0: (ASAP=1, burst exponent=0);

means for, at the observing station, determining a second time of arrival corresponding to a time at which the second FTM message arrives at the observing station;

means for obtaining, based on contents of one of the plurality of packetized FTM messages, a first transmission-related time associated with transmission or reception of the first FTM message from the first messaging station to the second messaging station;

means for obtaining, based on contents of one of the plurality of packetized FTM messages, a second transmission-related time associated with transmission or reception of the second FTM message from the second messaging station to the first messaging station; and means for estimating the position of the observing station based on (1) a position of the first messaging station, (2) a position of the second messaging station, (3) the first time of arrival, (4) the second time of arrival, (5) the first transmission-related time, and (6) the second transmission-related time.

22. The system of claim 21, wherein the first FTM message is an FTM frame, and the second FTM message is an acknowledgement message acknowledging the FTM frame.

23. The system of claim 22, wherein the first transmission-related time is a time of departure (ToD) corresponding to transmission of the first FTM message, as a first FTM frame, M, from the first messaging station, and wherein the second transmission-related time is a time of arrival (ToA) corresponding to reception of the second FTM message, as an acknowledgement frame for the first FTM frame, M, at the first messaging station.

24. The system of claim 23, wherein the first transmission-related time and second transmission-related time are obtained based on contents of a subsequent FTM frame, M+1.

25. The system of claim 21, wherein the configuration of the FTM session as an immediate, single-burst FTM session (ASAP=1, burst exponent=0) is requested by one of the first and second messaging stations and not subject to override by the other of the first and second messaging stations.

26. The system of claim 21, wherein the FTM session is initiated by an FTM request message, and the configuration of the FTM session as an immediate, single-burst FTM session (ASAP=1, burst exponent=0) is indicated by a bit in a trigger field in the FTM request message.

27. A non-transitory computer-readable storage medium comprising machine-readable instructions stored thereon, the instructions, when executed by one or more processors, causing the one or more processors to:

at an observing station, facilitate capturing a plurality of packetized Fine Timing Measurement (FTM) messages exchanged between a pair of messaging stations comprising a first messaging station and a second messaging station, the plurality of packetized FTM messages including a first FTM message originating from the first messaging station and intended for the second messaging station and further including a second FTM message originating from the second messaging station and intended for the first messaging station;

at the observing station, determine a first time of arrival corresponding to a time at which the first FTM message arrives at the observing station, wherein the first FTM message is part of an FTM session configured for an immediate, single burst by setting an As Soon As Possible (ASAP) parameter to a value of 1 and a burst exponent parameter to value of 0: (ASAP=1, burst exponent=0);

at the observing station, determine a second time of arrival corresponding to a time at which the second FTM message arrives at the observing station;

obtain, based on contents of one of the plurality of packetized FTM messages, a first transmission-related time associated with transmission or reception of the first FTM message from the first messaging station to the second messaging station;

obtain, based on contents of one of the plurality of packetized FTM messages, a second transmission-related time associated with transmission or reception of the second FTM message from the second messaging station to the first messaging station; and estimate the position of the observing station based on (1) a position of the first messaging station, (2) a position of the second messaging station, (3) the first time of arrival, (4) the second time of arrival, (5) the first transmission-related time, and (6) the second transmission-related time.

* * * * *